(12) United States Patent
Scholand

(10) Patent No.: US 8,711,977 B2
(45) Date of Patent: Apr. 29, 2014

(54) METHOD FOR TRANSMITTING A SIGNAL

(75) Inventor: Tobias Scholand, Muelheim (DE)

(73) Assignee: Intel Mobil Communications GmbH, Neubiberg (DE)

( * ) Notice: Subject to any disclaimer, the term of this patent is extended or adjusted under 35 U.S.C. 154(b) by 351 days.

(21) Appl. No.: 13/083,675

(22) Filed: Apr. 11, 2011

(65) Prior Publication Data

US 2012/0257686 A1    Oct. 11, 2012

(51) Int. Cl.
*H04L 27/00* (2006.01)

(52) U.S. Cl.
USPC ........... 375/299; 375/260; 375/267; 375/347; 375/349

(58) Field of Classification Search
USPC .................. 375/295, 260, 267, 299, 347, 349
See application file for complete search history.

(56) References Cited

U.S. PATENT DOCUMENTS

2010/0074357 A1* 3/2010 Ko ................................ 375/267

OTHER PUBLICATIONS

"3GPP TS 25.101: 3rd Generation Partnership Project; Technical Specification Group Radio Access Network; User Equipment Radio Transmission and Reception (Release 8)", 3rd Generation Partnership Project, v. 8.11.0, Jun. 2010, p. 1-215.
"3GPP TS 25.321: 3rd Generation Partnership Project; Technical Specification Group Radio Access Network; User Equipment Radio Transmission and Reception (Release 9)", 3rd Generation Partnership Project, v. 9.3.0, Jun. 2010, p. 1-192.

* cited by examiner

*Primary Examiner* — Kabir A Timory
(74) *Attorney, Agent, or Firm* — Eschweiler & Associates, LLC

(57) ABSTRACT

The method includes providing a stream of data to be transmitted, and processing the data by means of channel coding with a time-varying code rate, thereby generating a stream of channel coded data. The method further includes forming succeeding transmission time intervals and distributing the channel coded data on the transmission time intervals, and adjusting a transmission power of the signal to be transmitted by timely positioning a transmission power slope between two succeeding transmission time intervals so that the transmission power slope is contained completely within one transmission time interval of the two transmission time intervals, wherein the one transmission time interval comprises a lower nominal code rate or a lower nominal transmission power than the other one of the two transmission time intervals.

19 Claims, 4 Drawing Sheets

METHOD FOR TRANSMITTING A SIGNAL

FIELD

The present invention relates to a method for transmitting a signal in a mobile communication system and a transmitter for transmitting a signal in a mobile communication system.

BACKGROUND

In a mobile communication system the data rate can be adapted dynamically for efficiency reasons. The power of the transmitted signal also changes due to the data rate as every successfully transmitted bit must be paid for with a certain amount of transmitted energy. In a transmitter of a mobile communication system channel coding is usually employed, providing bit redundancy for the purpose of error protection. Channel coding can be employed with timely varying code rates. As very high code rates result in very low redundancy a problem arises in particular for certain modulation schemes when any amplitude variation is present in the transmitted signal.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
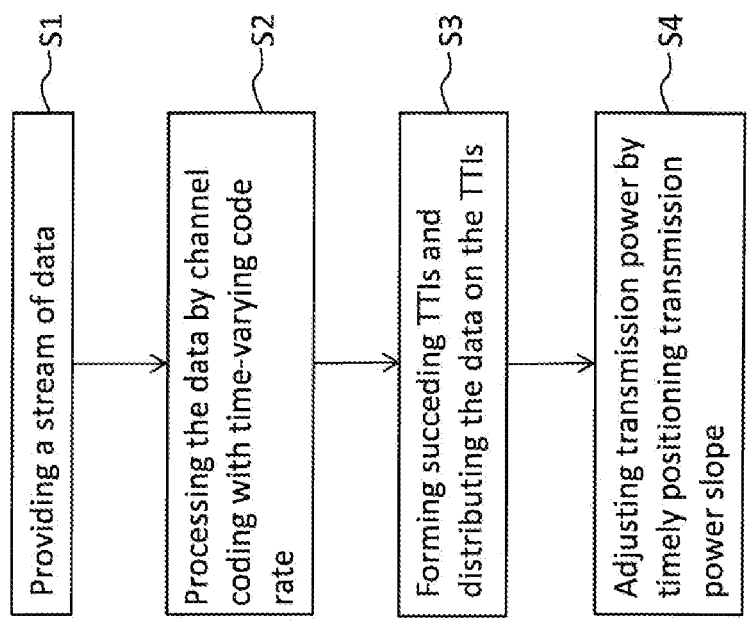
FIG. 1 shows a flow diagram of a method for transmitting a signal in a mobile communication system according to an embodiment.

The aspects and embodiments are described with reference to the drawings, wherein like reference numerals are generally utilized to refer to like elements throughout. In the following description, for purposes of explanation, numerous specific details are set forth in order to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form in order to facilitate describing one or more aspects of the embodiments. It is to be understood that other embodiments may be utilized and structural or logical changes may be made without departing from the scope of the present invention.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

The methods and apparatuses as described herein are utilized as part of and for mobile communication systems, in particular systems operating according to one of the 3G mobile communication standards. More particularly, the mobile communication systems may employ one or more of the Universal Mobile Telecommunications Systems (UMTS) Standard or the High Speed Packet Access (HSPA) Standard or the Long Term Evolution (LTE) Standard.

The method and apparatuses as described herein may be embodied in transmitters like base-stations or relay-stations as well as in mobile phones, hand-held devices or other kinds of mobile radio transmitters. The described apparatuses may be employed to perform methods as disclosed herein, although those methods may be performed in any other way as well.

The methods and apparatuses as described herein may also be utilized with any sort of antenna configurations employed within the mobile communication system. In particular, the concepts presented herein are applicable to mobile communication systems employing more than one transmit and/or receive antenna and in particular an arbitrary number of transmit and/or receive antennas.

Referring to FIG. 1, there is shown a flow diagram of a method for transmitting a signal in a mobile communication system according to an embodiment. The method comprises providing a stream of data to be transmitted at s1, and processing the data by means of channel coding with a time-varying code rate, thereby generating a stream of channel coded data at s2. The method further comprises forming succeeding transmission time intervals and distributing the channel coded data on the transmission time intervals at s3, and adjusting a transmission power of the signal to be transmitted by timely positioning a transmission power slope between two succeeding transmission time intervals so that the transmission power slope is contained completely within one transmission time interval of the two transmission time intervals, wherein the one transmission time interval comprises a lower nominal code rate or a lower nominal transmission power than the other one of the two transmission time intervals at s4.

According to an embodiment of the method of FIG. 1, adjusting the transmission power is performed as follows. The transmission power slope can either be a transmission power increase or a transmission power decrease between two succeeding transmission time intervals. If the nominal code rate or the nominal transmission power is to be increased from a relatively low value in a first trans-mission time interval to a relatively high value in a second transmission time interval, then a transmission power increase will completely occur within the preceding first transmission time interval, and if the nominal code rate or the nominal transmission power is to be decreased from a relatively high value in a first transmission time interval to a relatively low value in a second transmission time interval, then a transmission power decrease will completely occur within the succeeding second transmission time interval.

The term "nominal" as used in the foregoing within the terms "nominal code rate" or "nominal transmission power" is intended to be similar to the terms "intended", "pre-defined", "pre-determined", or "pre-calculated". For any given transmission time interval a so-called transport format is chosen beforehand which defines certain parameters or values of parameters of the transmission time interval as, for example, the channel coding, the modulation, or the transmission power. These parameters or values or at least some of them or all of them can be defined to be constant throughout the transmission time interval or at least constant throughout particular slots of the transmission time interval. The transport format can be chosen or selected by the baseband section of the transmitter of the communication unit.

It is one essential advantage of the method of FIG. 1 that it guarantees an essentially steady and constant transmission power level throughout the transmission time interval which carries data of a relatively high nominal code rate and corresponding low bit error redundancy. This transmission time interval is essentially free of too high power level variations. As a consequence, even for particular modulation schemes, it will be an easy task for a channel decoder at a receiver's site to decode the incoming channel coded data.

According to an embodiment of the method of FIG. 1, the method is also applied in situations in which one of the two adjacent transmission time intervals is virtually empty, i.e. being a transmission time interval in which no transmission occurs or no data are transmitted. In other words one can say that such a transmission time interval can be treated as a transmission time interval having low, namely zero, nominal code rate or low, namely zero, nominal transmission power.

It is to be noted that the method of FIG. 1 contains an alternative for deciding about the timely positioning, namely either the one transmission time interval comprises a lower nominal code rate or a lower nominal transmission power. It should be stated that in a practical implementation it might be easier to implement the second alternative, namely to look at the nominal transmission power. In most cases the result will be the same as would have been when taking the first alternative. However, one advantage can be that the implementation can be easier as the nominal transmission power is in any case known in the radiofrequency section of the transmission, whereas the nominal code rate is not necessarily known in the radiofrequency section and must be transmitted to the radiofrequency section in case of the first alternative.

According to an embodiment of the method of FIG. 1, the time duration of a transmission power slope is made below 50 µs, more particularly below 40 µs, and more particularly below 30 µs. In an embodiment presented below the duration will be about 25 µs. This value can be defined such that it relates to a power step between certain values of percentage of the nominal upper power level like, for example, 10% (5%) of the upper power level as a low value and 90% (95%) of the upper power level as a high value.

A mobile communication system functioning according to one of the 3G standards has to deal with dynamic data rates requested by the application layer using packet-switched (PS) connection. The lower layers down to the physical layer also adapt their data rates dynamically for efficiency reasons (e.g. cell capacity, power consumption etc.). The adaptation of the data rate can be done by the physical layer once per transmission time interval while these transmission time intervals are transmitting seamless in time.

In general the physical layer consists of a baseband and a radio frequency component. For a given transmission time interval the baseband chooses a transport format according to the instantaneous data rate. The transport format defines the channel coding or modulation and the transmit power. By this the quality of service like block error rate can be made approximately independent from the instantaneous data rate. The generated baseband signal is afterwards transmitted by the radio frequency component with the previous calculated transmit power. Therefore, the radio frequency component has to change the transmit power for every transmission time interval.

The radio frequency component can, however, not change the transmit power instantaneously. Since high data rates like those used in high speed packet access (HSPA) result in power changes of more than 20 dBm, the real change of the transmit power can easily make the reception of the effected transmission time intervals impossible. This results in lower throughput and worse user experience in dynamic data rate packet-switched connections.

In a mobile communication system working according to one of the 3G standards, requirements of the radio frequency component are defined about e.g. the error vector magnitude (EVM) in order to guarantee the quality of the transmitted signal. Any unintentional change in transmit power could cause these requirements to fail. Since the radio frequency component can not instantaneously change the transmission power, transient periods are given in which the transmission power is changed from one value to the other. During these transient periods no requirements like EVM are made and the radio frequency component is allowed to change the transmission in principle with an arbitrary slope. By this it is guaranteed that the transmission time interval is essentially unaffected by the power change.

Figure 2:
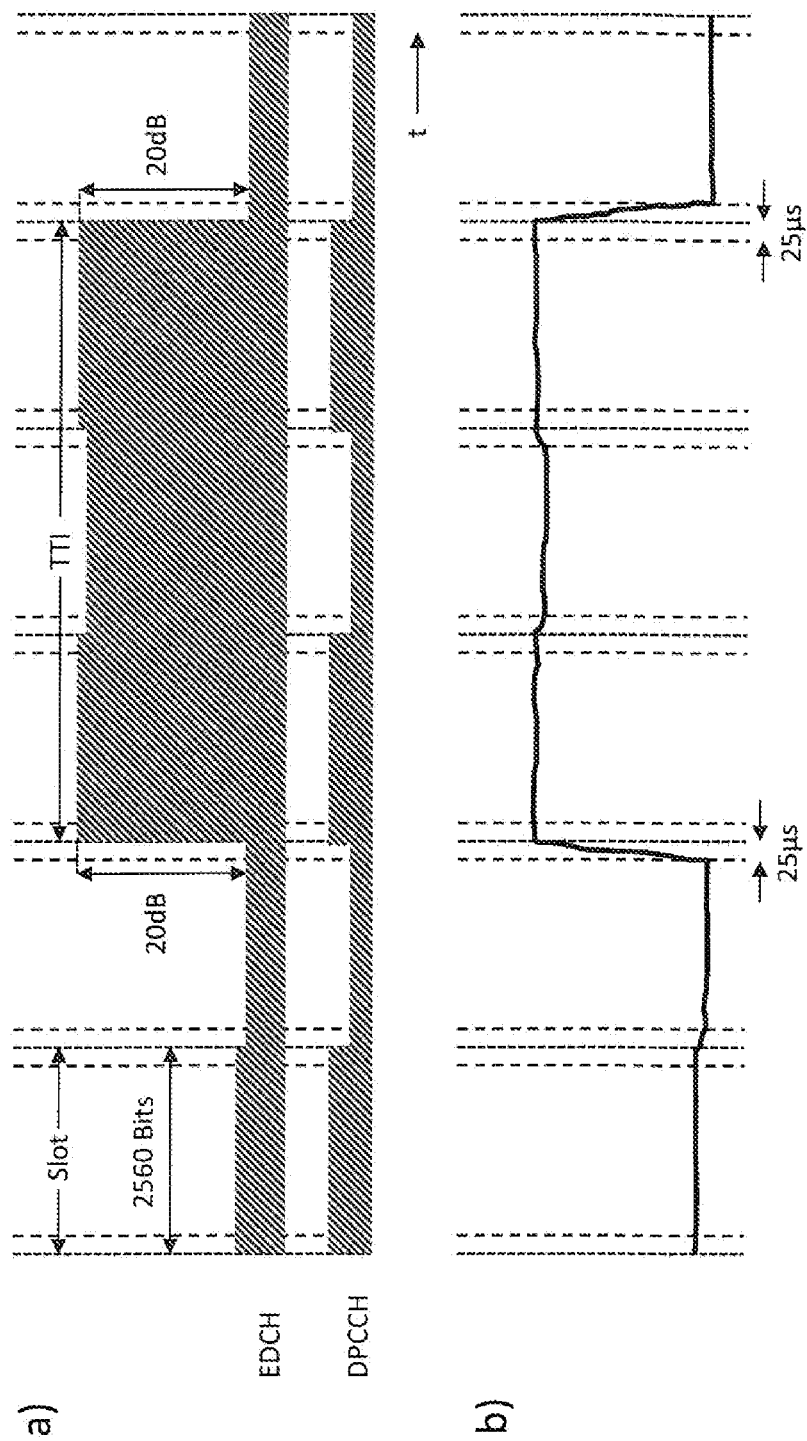
FIG. 2 shows a time diagram of a nominal transmission power according to a transport format change (a) and a variation of the transmission power (b)

Referring to FIGS. 2a and 2b, there is shown time diagrams: one of a nominal transmission power of transport format change (FIG. 2a), and the other a time-dependent real or effective transmission power (FIG. 2b) according to an embodiment. FIG. 2a represents a typical HSUPA transport format (E-TFC) change scenario. In this embodiment the transmission time interval (TTI) has a length of 2 ms and is divided in 3 slots with a length of 2560 bits each. For each TTI a special E-TFC selection procedure is performed, setting particular parameters for the transport block size, the error protection scheme, the coding rate, the modulation etc. These parameters are listed in tables together with integer E-TFCI values, each one of them designating a particular set of parameters. In addition, the amount of transmission power required to transmit a given E-TFC is calculated. This calculated transmit power is shown in FIG. 2a. The power of the up-link control channel DPCCH is only driven by the inner loop power control (ILPC) while the power of the data carrying up-link EDCH channel also changes due to the transport format change. The number of data bits per transmission time interval is given as transport block size. In the figure the first transmission time interval (E-TFCI=0) on the left (only two slots are shown) has a transport block size of 18 data bits changing to a transport block size of 22996 data bits in the second transmission time interval (E-TFCI=124), and thereafter changing back to a transport block size of 18 data bits in the third transmission time interval (only one slot is shown). The transmit power mainly scales with the transport block size since the data bits must be paid for with a certain amount of transmitted energy. This results in a calculated transmit power change of ±20 dBm or even more than that.

The mobile communication system as used in the scheme of FIGS. 2a and 2b is able to apply channel coding with very high code rates offering very low redundancy. In one embodiment the 3G high speed up-link packet access (HSUPA) uses 4PAM modulation with code rates up to R=0.9991. Thus, the available redundancy covers only 0.09% of the modulated bits. The reception of a 4PAM modulated signal becomes unreliable or even impossible when any amplitude error is present in the corresponding transmission time interval like that shown in FIGS. 2a and 2b.

Therefore, the position of the transmission power slope is adapted to the baseband signal coding or modulation used in the effected transmission time intervals. FIG. 2b shows the real or effective transmission power. As shown in FIG. 2b, one aspect of this embodiment is that the position of the transmission power slopes is timely positioned in transmission time intervals having stronger coding corresponding to lower nominal code rates. The code rate of the two adjacent transmission time intervals is R=0.175 whereas the code rate of the intermediate transmission time interval is R=0.9991.

For HSUPA smaller transport blocks always have stronger coding or modulation. Hence, one can assume that for every transport format change, causing high transmit power change, a transmission time interval with strong coding or modulation is present. Otherwise there would be no change in transport block size and subsequent transmit power. In FIG. 2b the transmission power slope is positioned in the left TTI for the first transport format change and positioned in the right TTI for the second transport format change. In addition it is shown in FIG. 2b that the duration of the transmission power slopes is about 25 µs. In particular it can be defined that this value relates to a power step between 10% (5%) and 90% (95%) of the upper power level. As a result, all transmission time intervals in FIG. 2b above can be received and decoded successfully and no throughput degradation is observed. In addition the presented solution fulfills the 3GPP requirements since the transmission power is still adjusted within the transient period.

According to an embodiment of the method of FIG. 1, the timely positioning of the transmission power slope according to step s4 can also be coupled to a condition. For example, it can be determined that one of the two succeeding transmission time intervals comprises a relatively low nominal code rate and the other one of the two succeeding transmission time intervals comprises a relatively high nominal code rate and that the timely positioning of the transmission power slope is performed only in a situation in which the difference between the relatively low nominal code rate and the relatively high nominal code rate is above a certain predetermined threshold. Another possible condition for performing the step s4 can be that the relatively high value of the nominal code rate is above a certain predetermined threshold value. It is also possible that both above-defined conditions can be added together. If the condition or the conditions are not fulfilled, then the transmission power change can be done according to any other method within the frame of the requirements of the corresponding 3G standard.

According to an embodiment of the method of FIG. 1, the method is carried out in a transmitter comprising a baseband section and a radio frequency section, and the method further comprises determining the timely position of the transmission power slope in the baseband section. According to an embodiment thereof, determining the timely position of the transmission power slope is performed according to the timely varying nominal code rate or the timely varying nominal transmission power. Furthermore, it is also possible that the baseband section generates a baseband signal and the transmission power slope is included or incorporated within the baseband signal.

According to an embodiment of the method of FIG. 1, the method is carried out in a transmitter comprising a baseband section and a radio frequency section and the method further comprises determining the timely position of the transmission power slope in the radio frequency section. Within this embodiment it is also possible that the timely position of the transmission power slope is determined according to the timely varying nominal code rate or the timely varying nominal transmission power.

According to an embodiment of the method of FIG. 1, the mobile communication system functions according to a 3G High Speed Packet Access (HSPA) standard.

According to an embodiment of the method of FIG. 1, the mobile communication system functions according to a 3G Long Term Evolution (LTE) standard.

Figure 3:
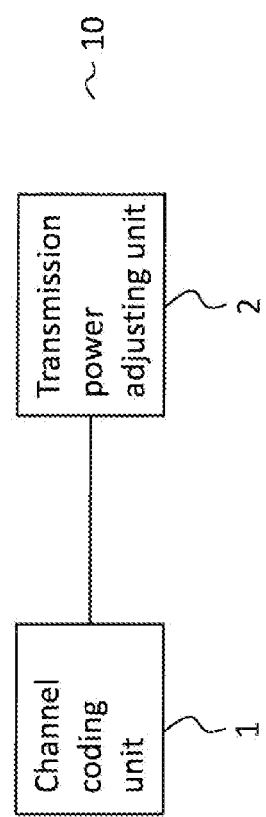
FIG. 3 shows a schematic block representation of a transmitter for transmitting a signal in a mobile communication system according to an embodiment.

Referring to FIG. 3, there is shown a schematic block representation of a transmitter for transmitting a signal in a mobile communication system. The transmitter 10 shows a channel coding unit 1 configured to receive a stream of data and perform a channel coding operation with a time-varying code rate. The transmitter 10 also comprises a transmission power adjusting unit 2 configured to adjust a transmission power of the signal to be transmitted by timely positioning a transmission power slope between two succeeding transmission time intervals so that the transmission power slope is contained completely within one transmission time interval of the two transmission time intervals, wherein the one transmission time interval comprises a lower nominal code rate or a lower nominal transmission power than the other one of the two transmission time intervals.

According to an embodiment of the transmitter of FIG. 3, the transmission power adjusting unit 2 is configured to adjust the time duration of the transmission power slope to below 50 µs, more particularly 40 µs, and more particularly 30 µs. Regarding the definition of the time duration, reference is made to the above.

According to an embodiment of the transmitter of FIG. 3, the transmission power adjusting unit 2 is configured to perform the step of timely positioning the transmission power slope only under a predefined condition. In particular, it can be assumed that one of the two succeeding transmission time intervals comprises a relatively low nominal code rate and the other one of the two succeeding transmission time intervals comprises a relatively high nominal code rate. The condition can be such that the difference between the relatively low nominal code rate and the relatively high nominal code rate is above a certain predetermined threshold. The transmission power adjusting unit is configured to timely position the transmission power slope according to other requirements like the general requirements as set in the 3G standard if the condition is not fulfilled. Alternatively, or in addition thereto, the transmission power adjusting unit is configured to perform the timely positioning only under the condition that the relatively high value of the nominal code rate is above a certain predetermined threshold value, otherwise following other requirements like 3G standard requirements.

According to an embodiment of the transmitter of FIG. 3, the transmitter 10 comprises a baseband section and a radio frequency section, and the channel coding unit 1 and the transmission power adjusting unit 2 are arranged in the baseband section. According to an embodiment thereof, the transmission power adjusting unit 2 is configured to determine the timely position of the transmission power slope according to the timely varying nominal code rate or to the timely varying nominal transmission power. Moreover, it can be provided that the baseband section is configured to generate a baseband signal, and the transmission power adjusting unit 2 is configured to incorporate the transmission power slope into the baseband signal.

According to an embodiment of the transmitter of FIG. 3, the transmitter 10 comprises a baseband section and a radio frequency section, and the channel coding unit is arranged in the baseband section and the transmission power adjusting unit 2 is arranged in the radio frequency section.

According to an embodiment thereof, the transmission power adjusting unit 2 is configured to determine the timely position of the transmission power slope according to the timely varying nominal code rate or to the timely varying nominal transmission power.

According to one embodiment of the transmitter of FIG. 3, the channel coding unit 1 is a convolutional coder or a turbo coder.

Figure 4:
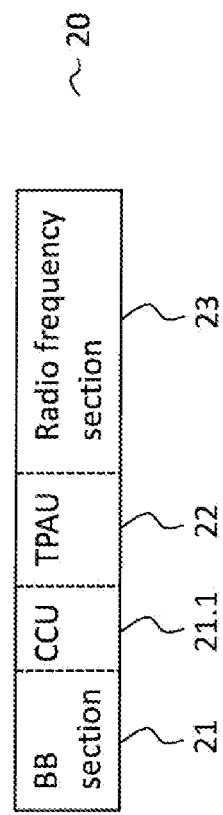
FIG. 4 shows a schematic block representation of a transmitter for transmitting a signal in a mobile communication system.

Referring to FIG. 4, there is shown a schematic block representation of a transmitter for transmitting a signal in a mobile communication system according to an embodiment. The transmitter 20 comprises a baseband section 21 comprising a channel coding section 21.1 configured to channel code a stream of date with a time-varying code rate. The transmitter 20 further comprises a transmission power adjusting unit (TPAU) 22 configured to adjust a transmission power of the signal to be transmitted by timely positioning a transmission power slope between two succeeding transmission time intervals so that the transmission power slope is contained completely within one transmission time interval of the two transmission time intervals, wherein the one transmission time interval comprises a lower nominal code rate or a lower nominal transmission power than the other one of the two transmission time intervals. The transmitter 20 further comprises a radio frequency section 23 coupled to the baseband section 21 to receive therefrom a stream of channel coded date.

According to an embodiment of the transmitter of FIG. 3, the transmission power adjusting unit 22 is part of the baseband section 21. According to an embodiment thereof, the transmission power adjusting unit 22 is configured to incorporate the transmission power slope into the baseband signal. Furthermore, the transmission power adjusting unit 22 can be configured to determine the timely position of the transmission power slope according to a timely varying nominal code rate or to a timely varying nominal transmission power.

According to an embodiment of the transmitter of FIG. 3, the transmission power adjusting unit 22 is part of the radio frequency section 23. According to an embodiment thereof, the transmission power adjusting unit 22 is configured to determine the timely position of the transmission power slope according to the timely varying nominal code rate or to the timely varying nominal transmission power.

What is claimed is:

1. A method for transmitting a signal in a mobile communication system, comprising:
providing a stream of data to be transmitted;
processing the data by channel coding with a time-varying code rate, thereby generating a stream of channel coded data;
forming succeeding transmission time intervals and distributing the channel coded data on the transmission time intervals; and
adjusting a transmission power of the signal to be transmitted by timely positioning a transmission power slope between two succeeding transmission time intervals so that the transmission power slope is contained completely within one transmission time interval of the two transmission time intervals, wherein the one transmission time interval comprises a lower nominal code rate or a lower nominal transmission power than the other one of the two transmission time intervals,
wherein one of the two succeeding transmission time intervals comprises a first nominal code rate or a first nominal transmission power and the other one of the two succeeding transmission time intervals comprises a second nominal code rate or a second nominal transmission power, respectively, and wherein the second nominal code rate or the second nominal transmission power is greater than the first nominal code rate or the first nominal transmission power, respectively, the method further comprising:
adjusting the transmission power slope if the difference between the first nominal code rate and the second nominal code rate or between the first nominal transmission power and the second nominal transmission power is above a predetermined threshold.

2. The method according to claim 1, wherein the time duration of a transmission power slope is below 50 μs.

3. The method according to claim 1, wherein one of the two succeeding transmission time intervals comprises a first nominal code rate or a first nominal transmission power and the other one of the two succeeding transmission time intervals comprises a second nominal code rate or a second nominal transmission power, respectively, and wherein the second nominal code rate or the second nominal transmission power is greater than the first nominal code rate or the first nominal transmission power, respectively, the method further comprising:
adjusting the transmission power if the second nominal code rate or the second nominal transmission power is above a predetermined threshold value.

4. The method according to claim 1, wherein the method is carried out in a transmitter comprising a baseband section and a radio frequency section, the method further comprising:
determining the timely position of the transmission power slope in the baseband section.

5. The method according to claim 4, further comprising:
determining the timely position of the transmission power slope according to a varying nominal code rate or a varying nominal transmission power.

6. The method according to claim 4, wherein the baseband section generates a baseband signal and the transmission power slope is included in the baseband signal.

7. The method according to claim 1, wherein the method is carried out in a transmitter comprising a baseband section and a radio frequency section, the method further comprising:
determining the timely position of the transmission power slope in the radio frequency section.

8. The method according to claim 7, further comprising:
determining the timely position of the transmission power slope according to a varying nominal code rate or a varying nominal transmission power.

9. The method according to claim 1, wherein the mobile communication system operates according to a 3G High Speed Packet Access (HSPA) standard.

10. The method according to claim 1, wherein the mobile communication systems operates according to a 3G Long Term Evolution (LTE) standard.

11. A method for transmitting a signal in a mobile communication system, comprising:
providing a stream of data to be transmitted;
processing the data by channel coding with a time-varying code rate, thereby generating a stream of channel coded data;

forming succeeding transmission time intervals and distributing the channel coded data on the transmission time intervals;

adjusting a transmission power of the signal to be transmitted by timely positioning a transmission power slope between two succeeding transmission time intervals so that the transmission power slope is contained completely within one trans-mission time interval of the two transmission time intervals, wherein the one transmission time interval comprises a lower nominal code rate or a lower nominal transmission power than the other one of the two transmission time intervals; and adjusting the transmission power according to the following:

if a nominal code rate or a nominal transmission power is to be increased from a first value in a first transmission time interval to a second value in a second transmission time interval, wherein the second value is greater than the first value, then a transmission power increase will completely occur within the first transmission time interval, and if the nominal code rate or the nominal transmission power is to be decreased from a third value in a first transmission time interval to a fourth value in a second transmission time interval, wherein the fourth value is less than the third value, then a transmission power decrease will completely occur within the second transmission time interval.

12. A transmitter for transmitting a signal in a mobile communication system, comprising:

a channel coding unit configured to receive a stream of data to be transmitted and perform a channel coding operation with a time-varying code rate; and a transmission power adjusting unit configured to adjust a transmission power of the signal to be transmitted by timely positioning a transmission power slope between two succeeding transmission time intervals so that the transmission power slope is contained completely within one transmission time interval of the two transmission time intervals, wherein the one transmission time interval comprises a lower nominal code rate or a lower nominal transmission power than the other one of the two transmission time intervals, wherein one of the two succeeding transmission time intervals comprises a first nominal code rate or a first nominal transmission power and the other one of the two succeeding transmission time intervals comprises a second nominal code rate or a second nominal transmission power, respectively, and wherein the second nominal code rate or the second nominal transmission power is greater than the first nominal code rate or the first nominal transmission power, respectively, and wherein the transmission power adjusting unit is configured to timely position the transmission power slope only if the difference between the first nominal code rate and the second nominal code rate or between the first nominal transmission power and the second nominal transmission power is above a predetermined threshold.

13. The transmitter according to claim 12, wherein the transmission power adjusting unit is configured to adjust the time duration of the transmission power slope to below 50 µs.

14. The transmitter according to claim 12:

wherein one of the two succeeding transmission time intervals comprises a first nominal code rate and the other one of the two succeeding transmission time intervals comprises a second nominal code rate, and wherein the second nominal code rate is greater than the first nominal code rate, and wherein the transmission power adjusting unit is configured to timely position the transmission power slope only if the second nominal code rate is above a predetermined threshold value.

15. The transmitter according to claim 12, further comprising:

a baseband section and a radio frequency section, wherein the channel coding unit and the transmission power adjusting unit are arranged in the baseband section.

16. The transmitter according to claim 15, wherein the transmission power adjusting unit is configured to determine the timely position of the transmission power slope according to the timely varying nominal code rate or to the timely varying nominal transmission power.

17. The transmitter according to claim 15, wherein the baseband section is configured to generate a baseband signal, and the transmission power adjusting unit is configured to incorporate the transmission power slope into the baseband signal.

18. The transmitter according to claim 12, further comprising:

a baseband section and a radio frequency section, wherein the channel coding unit is arranged in the baseband section and the transmission power adjusting unit arranged in the radio frequency section.

19. The transmitter according to claim 18, wherein the transmission power adjusting unit is configured to determine the timely position of the transmission power slope according to a varying nominal code rate or a varying nominal transmission power.

* * * * *